United States Patent [19]

Nakamura et al.

[11] Patent Number: 5,249,423
[45] Date of Patent: Oct. 5, 1993

[54] MASTER CYLINDER

[75] Inventors: Kaoru Nakamura, Anjo; Haruo Arakawa, Toyota, both of Japan

[73] Assignee: Aisin Seiki Kabushiki Kaisha, Kariya, Japan

[21] Appl. No.: 848,938

[22] Filed: Mar. 10, 1992

[30] Foreign Application Priority Data

Mar. 30, 1991 [JP] Japan .................... 3-028396[U]

[51] Int. Cl.⁵ .............................................. B60T 11/20
[52] U.S. Cl. ............................ 60/562; 60/585;
  60/588; 92/81; 92/86.5; 92/107; 92/130 R
[58] Field of Search .................. 60/562, 585, 588;
  92/81, 86.5, 107, 130 R, 162 R

[56] References Cited

U.S. PATENT DOCUMENTS

| 3,555,822 | 1/1971 | Rivetti | 60/562 |
| 4,152,897 | 5/1979 | Falk | 60/562 |
| 4,688,382 | 8/1987 | Farr | 60/562 |
| 4,964,274 | 10/1990 | Bacardit | |

FOREIGN PATENT DOCUMENTS

| 3021893 | 12/1980 | Fed. Rep. of Germany . | |
| 317092 | 1/1934 | Italy | 60/588 |
| 1002251 | 8/1965 | United Kingdom . | |
| 1252623 | 11/1971 | United Kingdom . | |
| 2052656A | 1/1981 | United Kingdom . | |
| 2126295 | 3/1984 | United Kingdom | 60/562 |
| 2165327A | 4/1986 | United Kingdom . | |

Primary Examiner—Edward K. Look
Assistant Examiner—Todd Mattingly
Attorney, Agent, or Firm—Burns, Doane, Swecker & Mathis

[57] ABSTRACT

A master cylinder includes a second piston that is provided with a hollow portion. The hollow portion includes a yoke portion for receiving an end of the second return spring, a cylindrical portion having a diameter that is larger than the diameter of the second return spring, and a tapered portion located at the open end of the hollow portion. The second return spring is disposed within the yoke portion so that the second return spring is coaxially arranged with respect to the second piston. Thus, although the second return spring is capable of moving rapidly to and fro within the hollow portion, the construction of the second piston and the arrangement of the second return spring within the hollow portion of the second piston helps avoid interference between the second piston and the second return spring. Thus, unpleasant noise can be reduced or eliminated. Moreover, small particles that would normally result when the second return spring scratches the second piston are not as likely to arise.

5 Claims, 3 Drawing Sheets

MASTER CYLINDER

FIELD OF THE INVENTION

This invention relates to a master cylinder, and in particular to a tandem master cylinder in which a pair of coaxial fluid-pressure chambers are arranged for supplying the fluid pressure therefrom to the corresponding fluid circuits.

BACKGROUND OF THE INVENTION

Referring now to FIG. 4, a conventional vehicle brake master cylinder, which is disclosed in German laid-open patent publication DE 30 21 893-A published on Dec. 18, 1980, is explained. The brake master cylinder has a reservoir tank (1) and a cylinder (2). The reservoir tank (1) is integrally provided with the cylinder (2). In the cylinder (2), a first piston (3) and a second piston (5) are coaxially disposed. Both the first piston (3) and the second piston (5) are capable of sliding in the cylinder (2) in response to a depression force from a brake pedal (not shown). The first piston (3) receives the depressing force from the brake pedal via a brake booster (not shown). The second piston (5) receives the axial pressure from the first piston (3) via a first return spring (4). Further, the second piston (5) supports a second return spring (7). The second return spring (7) is inserted in a hollow portion (6) of the second piston (5). The second return spring (7) is pinched between a bottom (8) of the cylinder (2) and the second piston (5). A projection (8a) is formed on the bottom (8) of the cylinder (2). The projection (8a) sustains the spring (7) coaxially with respect to the cylinder (2). A length of the cylinder (2) can be reduced by inserting one end of the spring (7) into the hollow portion (6) of the second piston (5).

A first pressure chamber (9) is formed between the first piston (3) and the second piston (5). A second pressure chamber (10) is formed between the the bottom (8) of the cylinder (2) and the second piston (5). The first pressure chamber (9) and the second pressure chamber (10) are connected to the reservoir tank (1) via communication ports (11) and (12). The first pressure chamber (9) and the second pressure chamber (10) are connected to the brake pipes (not shown) via outlet ports (not shown) and supply brake pressure to each linkage of the vehicle brake system. Further, a first supply chamber (13) is formed around the first piston (3). A second supply chamber (14) is formed around the second piston (5). The first supply chamber (13) and the second supply chamber (14) are connected to the reservoir tank (1). The first supply chamber (13) is capable of communicating with the first pressure chamber (9) when the first pressure chamber (9) has a lower pressure than the first supply chamber (13). The second supply chamber (14) is capable of communicating with the second pressure chamber (10) when the second pressure chamber (10) has a lower pressure than the second supply chamber (14).

However, when vibration is affected to the master cylinder from the vehicle body, the second return spring (7) moves rapidly to and fro. A middle part of the second return spring (7), which almost locates an open end of the second piston (5), moves most intensely. Due to the rapid movements of the second return spring (7), the hollow portion (6) of the second piston (5) may be scratched by the second return spring (7). Further, unpleasant noise may be generated due to interference between the second return spring (7) and the second piston (5). When the second return spring (7) scratches the second piston (5), very small particles are removed from both the second return spring (7) and the second piston (5). These small particles may slightly deteriorate the ability of the primary cups (15) and (16) to remain fluid tight.

Further, the conventional master cylinder is hard to assemble because the second return spring (7) and the second piston (5) must be located very carefully in the narrow cylinder (2). Therefore, a long period of time is required to assemble the master cylinder (2) and thus the master cylinder (2) becomes expensive.

SUMMARY OF THE INVENTION

Accordingly, one of the objects of this invention is to solve the above conventional drawbacks.

Further, one of the objects of this invention is to reduce interference between a second piston and a second return spring.

Furthermore, one of the objects of this invention is to prevent the generation of unpleasant noise between a second piston and a second return spring.

Yet further, one of the objects of this invention is to prevent very small particles from being scratched off a second piston and a second return spring due to contact between the second return spring and the second piston.

Still further, one of the objects of this invention is to reduce the required for assembling a master cylinder.

To achieve the above described objects, a master cylinder of this invention includes a second piston which has a hollow portion wherein the hollow portion further includes a yoke portion fitting with the second return spring, a cylindrical portion having a larger diameter than the second return spring and a tapered portion having an open end.

A second return spring is sustained by the yoke portion so that the second return spring is disposed coaxially with respect to the second piston. Although the second return spring is capable of moving rapidly to and fro in the hollow portion of the second piston, a middle portion of the second return spring, which moves most intensely, is not as likely to come into contact with the second piston since the tapered portion is provided on the open end of the second piston. Therefore, unpleasant noise can be reduced or eliminated. Moreover, it is much less likely that very small particles resulting from contact between the second piston and the second return spring will be generated.

Other objects and advantages of this invention will become apparent from the following description and accompanying drawings.

DESCRIPTION OF THE PREFERRED EMBODIMENT

Figure 1:
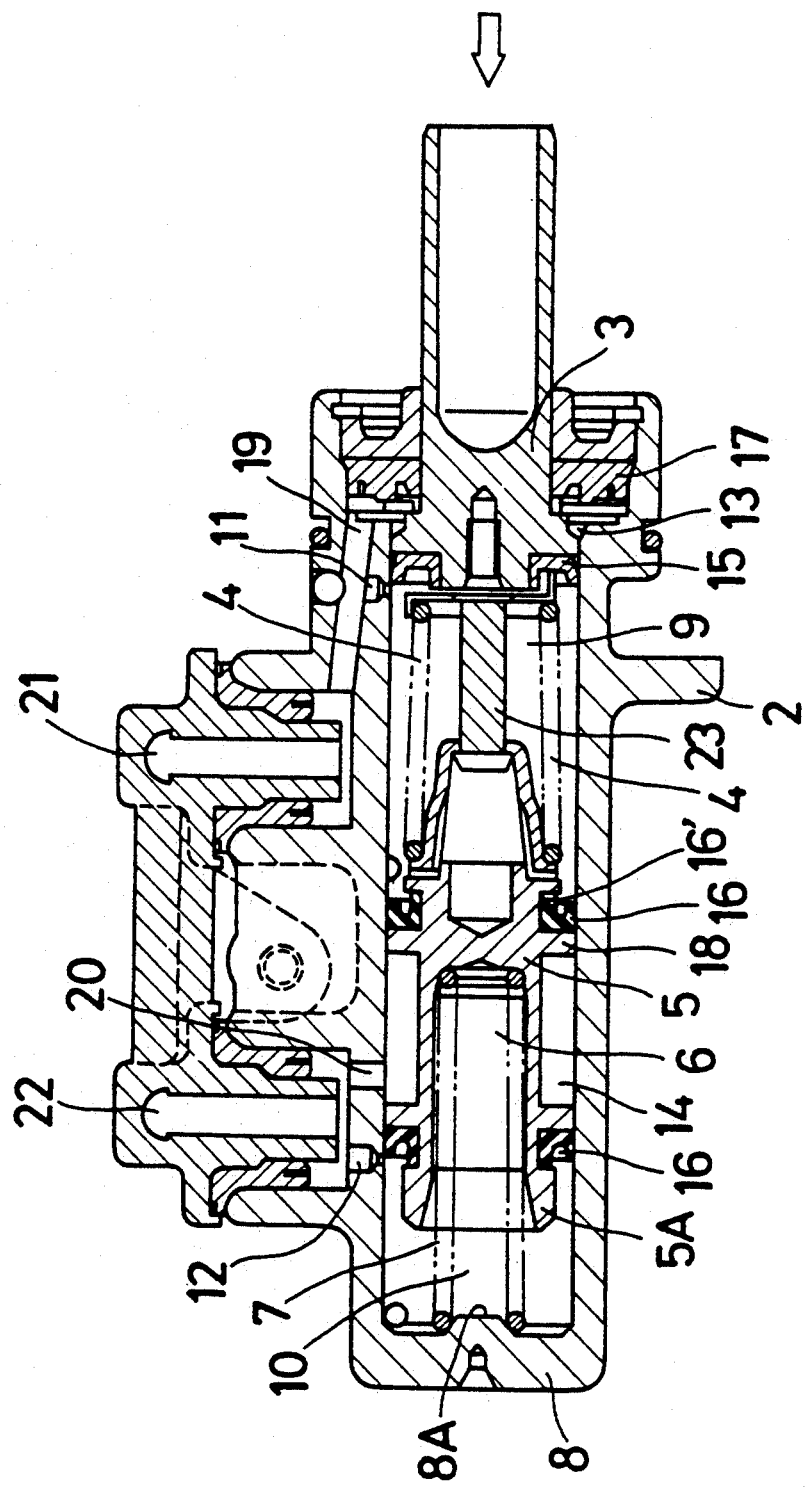
FIG. 1 is a cross-sectional view of a brake master cylinder relating to the present invention.
Figure 2:
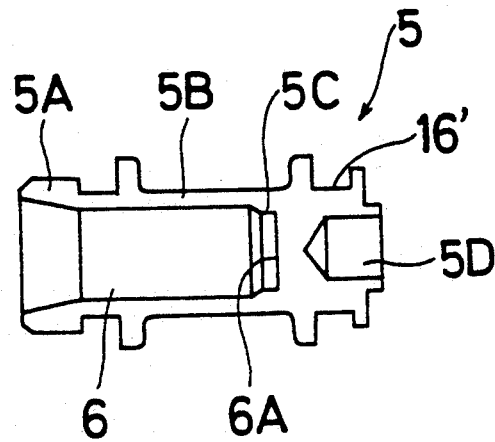
FIG. 2 is a cross-sectional view of a second piston relating to the present invention.
Figure 3:
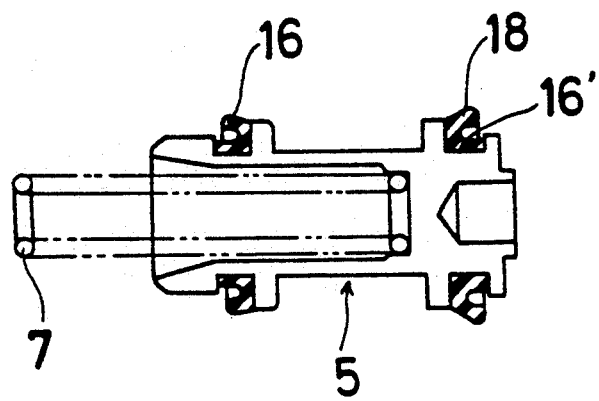
FIG. 3 is a cross-sectional view of a second piston and second return spring relating to the present invention.
Figure 4:
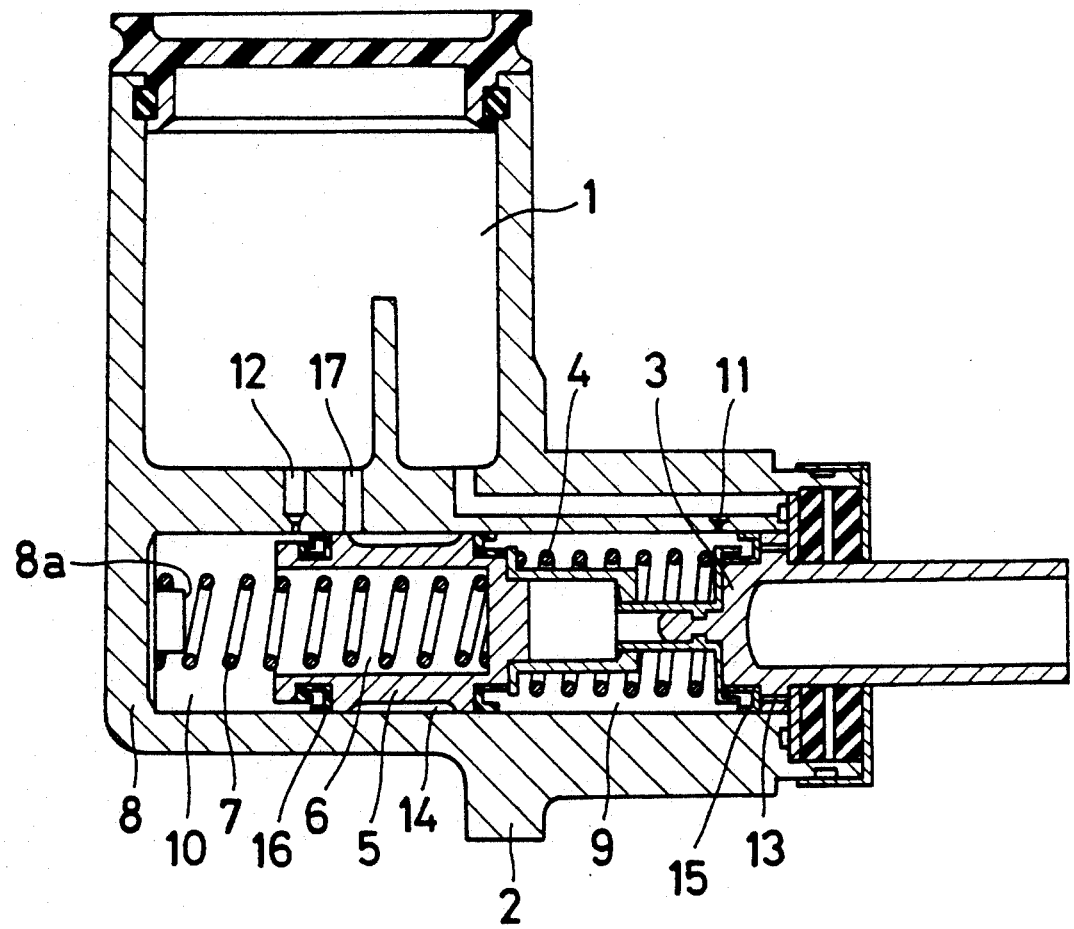
FIG. 4 is a cross-sectional view of a conventional brake master cylinder.

Referring now to FIG. 1, a master cylinder according to the present invention is explained. The master cylinder includes a separate reservoir tank (not shown). The master cylinder connects to the reservoir tank via communication pipes (21) and (22). The master cylinder includes a first piston (3), a second piston (5), a first return spring (4), a second return spring (7), a first pressure chamber (9) and a second pressure chamber (10). The alignment of these elements (3), (5), (4), (7), (9) and (10) are the same as in the conventional apparatus which has been already explained in the description of the background of the invention. Therefore, regarding these elements (3), (5), (4), (7), (9) and (10), a detailed description of the present invention will not be included here. The second piston (5) includes a hollow portion (6) wherein the hollow portion (6) further includes a tapered portion (5A) having an open end. As seen in FIGS. 1-3, the outer peripheral surface of the second piston 5 is also provided with a recess or groove 16' for receiving a primary cup 16.

FIG. 2 shows a cross-sectional view of the second piston (5). The second piston (5) has the tapered portion (5A), a cylindrical portion (5B) and a yoke portion (5C). The tapered potion (5A) becomes wide toward a bottom (8) of the cylinder (2) and becomes narrow toward the cylindrical portion (5B). The cylindrical portion (5B) a constant diameter. The yoke portion (5C) has also has a tapered portion which becomes wide toward the cylindrical portion (5B) and narrow toward a bottom (6a) of the hollow portion (6). The second piston (5) further includes a depression (5D). A rod (23) of the first piston (3) enters into the depression (5D) when the first return spring (4) is compressed.

FIG. 3 shows a cross-sectional view of the second piston (5) including the second return spring (7). As shown in FIG. 3, the yoke Portion (5C) has almost the same diameter as the second return spring (7) so as to fit the second spring (7) into the york portion (5C). Thus, the second piston (5) and the second return spring (7) can be assembled as a sub-assembly. The sub-assembly can be inserted into the cylinder (2) easily. Therefore, the time required for assembling the master cylinder can be reduced by preparing the sub-assembly in advance to the insertion.

Both the tapered portion (5A) and the cylindrical portion (5B) have a larger diameter than the second return spring (7). Further, the second return spring (7) is disposed coaxially with respect to the second piston (5) by the yoke portion (5C). Thus, the second return spring (7) can hardly interfere the second piston (5). Therefore, the second return spring (7) does not scratch the second piston (5) so that the very small scratched particles are not formed.

In this embodiment, the second return spring (7) is held by a Projection (8a) at the bottom (8) of the cylinder (2). The second piston (5) does not receive inclined force since both ends of the second return spring (7) are held coaxially with respect to the cylinder (2). Thus, the primary cup (16) and the pressure cup (18) do not wear away partially.

Many modification may be made without departing the scope or spirit of this invention. Further, this description and attached drawings explains only a brake master cylinder, but this invention can be adapted to clutch master cylinders and other fluid cylinders.

What is claimed is:

1. A master cylinder comprising:
   a cylinder having a bottom;
   a first piston slidably disposed in the cylinder;
   a second piston slidably disposed in the cylinder;
   a first pressure chamber formed between the first piston and the second piston;
   a second pressure chamber formed between the second piston and the bottom of the cylinder;
   a first return spring provided in the first pressure chamber;
   a second return spring provided in the second pressure chamber
   a hollow portion in the second piston for receiving at least a portion of the second return spring, said hollow portion having an open end and an oppositely positioned bottom end, said hollow portion including a cylindrical portion that merges into a yoke portion, said yoke portion narrowing in diameter in a direction from the cylindrical portion toward the bottom end of the hollow portion, one end of said second return spring being received in the yoke portion adjacent the bottom end of the hollow portion so that the second return spring is positioned coaxially with respect to the second piston; and
   a tapered portion provided on the open end of the hollow portion.

2. An apparatus as recited in claim 1, further comprising:
   a projection provided on the bottom of the cylinder for locating the second return spring coaxially with respect to the cylinder.

3. An apparatus as recited in claim 1, wherein an outer peripheral surface of said second piston includes a groove that receives a primary cup.

4. An apparatus as recited in claim 1, wherein the cylindrical portion has a constant diameter that is greater than the diameter of the second return spring.

5. An apparatus as recited in claim 4, wherein said yoke portion that receives said second spring has a diameter that is substantially equal to the diameter of the second return spring.

* * * * *